March 28, 1933.   T. B. MATTINGLY   1,903,056
CLOSURE OPERATING DEVICE
Filed Oct. 15, 1930
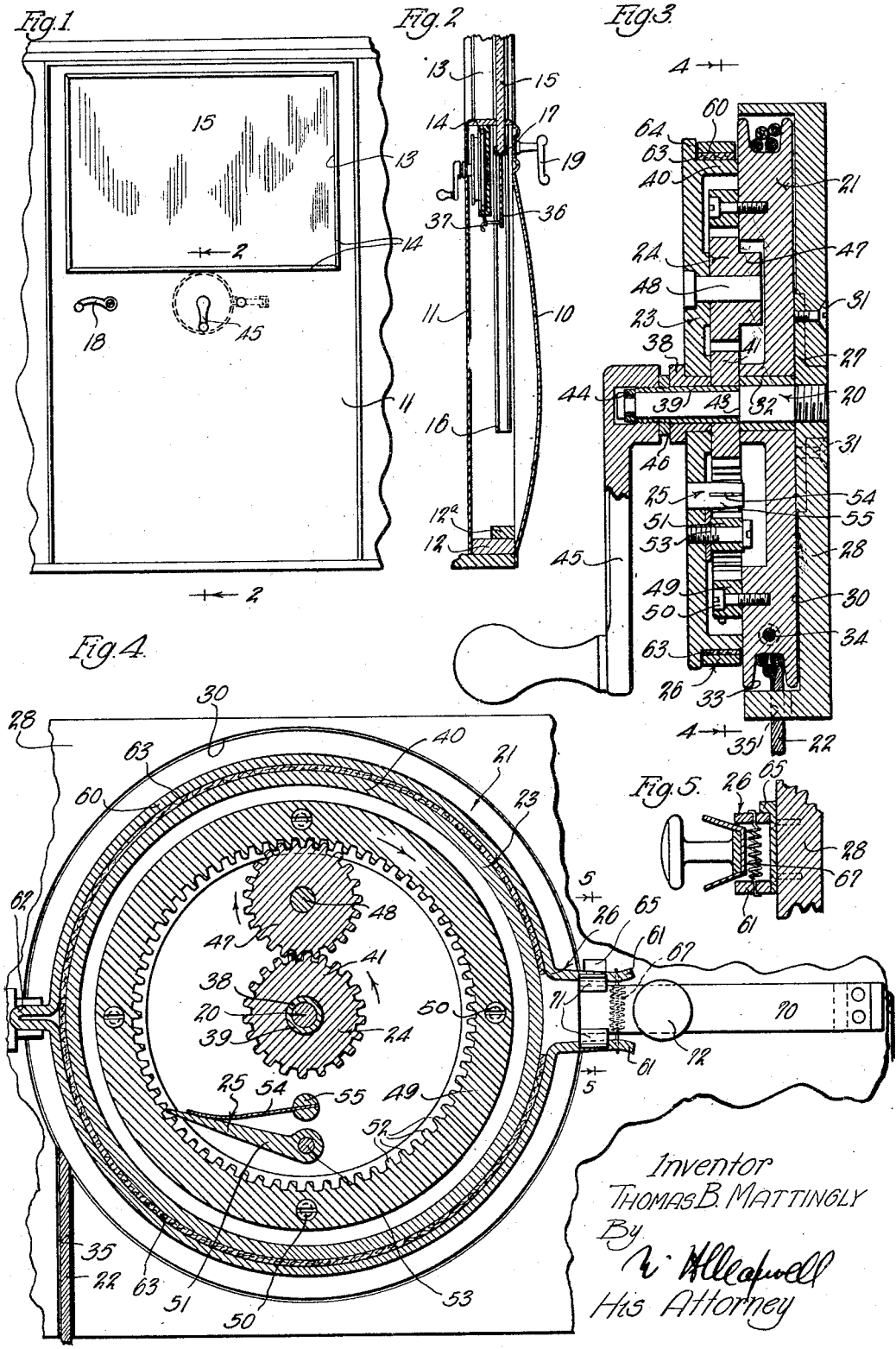
Inventor
Thomas B. Mattingly
By
His Attorney Patented Mar. 28, 1933

1,903,056

UNITED STATES PATENT OFFICE

THOMAS B. MATTINGLY, OF HUNTINGTON PARK, CALIFORNIA

CLOSURE OPERATING DEVICE

Application filed October 15, 1930. Serial No. 488,868.

This invention relates to a closure operating device, and relates more particularly to mechanism for operating a sliding closure or window, for example, the window of an automobile, or the like.

It is a general object of the invention to provide a simple, practical, and effective device for operating a sliding window of an automobile, or the like.

With the forms of devices now in general use for operating the sliding windows of vehicles, it is necessary to turn a crank to lower the window as well as to raise it. Many times it is desirable to lower a vehicle window quickly; for example, where the driver or operator of the vehicle wishes to make a traffic signal, it is desirable to lower the window rapidly. With the common forms of window-operating devices, it is necessary for the operator to rotate a handle or crank several times to lower the window. This is extremely inconvenient when the operator of the vehicle is handling the steering wheel and/or other controls of the vehicle.

It is an object of the invention to provide a window-operating device by which the window may be lowered very rapidly in a convenient manner without operating a crank.

It is another object of the invention to provide a closure or window-operating device of the character mentioned by which a window may be easily raised and positioned as desired, and may be permitted to drop or lower through its own weight.

It is another object of the invention to provide a window-operating device by which the window may be lowered by operating or pushing a conveniently located push button, or the like. The downward movement of the window may be effectively controlled and governed and the window may be stopped in any desired position by means of the push button.

It is a further object of the invention to provide a closure operating device of the character mentioned that is particularly simple and compact in construction, and which may be readily embodied in the door or body structure of an automobile or other vehicle.

Other objects and features of the invention will be best and more fully understood from the following detailed description of a typical form and application of the invention, throughout which description reference is had to the accompanying drawing, in which:

Fig. 1 is a side elevation of the interior of a vehicle door, illustrating the controls of the mechanism provided by this invention mounted thereon. Fig. 2 is an enlarged vertical detailed sectional view of a portion of the door structure, being a view taken substantially as indicated by line 2—2 on Fig. 1. Fig. 3 is an enlarged vertical detailed sectional view of the device provided by the present invention. Fig. 4 is a transverse detailed sectional view taken as indicated by line 4—4 on Fig. 3, and Fig. 5 is an enlarged detailed sectional view of the brake releasing means, being a view taken as indicated by line 5—5 on Fig. 4.

The present invention is particularly well suited for operating the window of an automobile, or like vehicle, and throughout the following detailed disclosure the invention will be set forth as employed to operate a sliding window in the door of an automobile. The device is useful in numerous other situations, and the invention is not to be considered as restricted to the particular form of application about to be described, but is to be taken as including any features or modifications that may fall within the scope of the claims.

The vehicle body or door construction illustrated in the drawing includes the door having an exterior plate or side 10 and an inner side 11 spaced from the plate 10. The inner side of the door may be formed of suitable upholstery, or the like. The sides 10 and 11 of the door are attached at their lower ends to a suitable frame member 12. Registering rectangular openings constituting a window opening 13 are provided in the upper portion of the door. The window opening 13 may be bounded or cased by a suitable casing 14. The window or closure 15 for the window opening 13 may be considered as being formed of glass. The window 15 is vertically disposed and extends through an opening in the casing 14 at the lower edge of the window opening. The window 15 may be guided for vertical movement at its vertical side edges by suitable guides 16. A metal protective channel plate 17 may be provided on the lower edge of the window 15. A latch handle 18 may project from the inner side of the door for operating a latch for retaining the door in the closed position. A similar latch handle 19 may project from the outer side 10 of the door.

The device provided by this invention includes, generally, a shaft 20, a sheave or pulley 21 rotatable on the shaft 20 and carrying a line 22 for operating the window 15, an outer plate or braking drum 23, manually operable means 24 for rotating the sheave 21 in one direction to raise the window 15, ratchet means 25 for connecting the sheave 21 with the drum 23, and releasable braking means 26 normally holding the drum 23 against rotation and releasable to permit rotation of the drum and sheave 21 to allow the window 15 to lower.

The shaft 20 is provided to carry the various other parts of the mechanism, and may be mounted in the vehicle door or body structure in any suitable manner. The shaft 20 is horizontally disposed and projects inwardly from the inner side 11 of the door. In the particular form of the invention illustrated in the drawing, a collar 27 is fixed on the outer end of the shaft 20 and is attached to a vertically disposed mounting member 28. The collar 27 is countersunk in the member 28 to be flush with the bottom or inner side of a round depression or recess 30 in the inner side of the mounting member 28. The shaft 20 is held stationary, and the collar 27 is secured to the member 28 by suitable screws 31 passing through the member and threaded into openings in the collar.

The pulley or sheave 21 is rotatably mounted on the shaft 20 within the recess 30. The sheave 21 is provided to carry the line or cable 22 and fits the recess 30 with suitable clearance. In the case illustrated in the drawing, the sheave 21 is rotatably mounted on the shaft 20, within the recess 30, through a suitable bushing 32. A groove 33 is provided in the periphery of the sheave 21 to carry the cable 22.

The cable 22 has an end secured to the sheave 21 and an end attached to the lower portion of the window 15. The line or cable may be attached to the sheave in any suitable manner. In the case illustrated, the cable 22 has an end portion secured in a tangential opening 34 in the base of the groove 33. The cable passes downwardly from the sheave 21 through an opening 35 in the mounting member 28 to the lower edge of the window 15. A plate 36 may be attached to the channel member 17 on the lower edge of the window 15, and an inwardly projecting arm or lug 37 may be provided on the lower end of the plate to receive the end of the cable 22. A bumper 12ª of rubber, or the like, may be mounted on the frame member 12 to receive the plate 36.

The plate or drum 23 is freely rotatable on the shaft 20, and is provided to co-operate with or receive the braking means 26 and to carry the ratchet means 25 and a portion of the sheave-operating means 24. The drum 23 is mounted on the shaft 20 at a point spaced inwardly of the sheave 21. A bushing 38 may be provided in a central opening in the drum 23. The bushing 38 rotatably passes a sleeve 39 arranged on the shaft 20. An axially extending flange 40 is provided at the perimeter of the drum 23 to co-operate with the braking means 26. The flange 40 may extend outwardly to a point adjacent the inner side of the sheave 21.

The means 24 for operating or rotating the sheave 21 to raise the window 15 is manually operable, and includes the sleeve 39 and a pinion 41 fixed on the sleeve 39 at the inner end of the drum 23. The sleeve 39 projects inwardly from the drum and bushing 38 to extend from the inner side 11 of the door structure. The sleeve 39 is freely rotatable on the shaft 20, and is held against longitudinal movement between a shoulder 43 on the shaft and a split spring retaining collar 44 arranged in an angular groove in the end portion of the shaft 20. A suitable handle or crank 45 is mounted on the projecting end part of the sleeve 39. The handle 45 may be screw-threaded onto the sleeve 39, and a suitable clamping nut 46 may be arranged between the inner end of the handle and the bushing 38.

The operating means 24 includes an intermediate or planetary pinion 47 engaged or driven by the pinion 41. The planetary pinion 47 is rotatably mounted on a stud 48 projecting inwardly from the inner side of the drum 23. The inner side of the sheave 21 may be relieved or recessed to receive the end of the stud 48 and the hub portion of the pinion 47. The pinion 47 meshes with an annular internal gear 49 mounted on the inner side of the sheave 21. The internal gear 49 may be attached to the sheave 21 by suitable screws 50. Rotation of the handle 45 and the pinion 41 in the direction indicated by the arrow in Fig. 4 of the drawing causes the line or cable 22 to be wound on the sheave 21. During raising of the window 15 in this manner, the drum 23 is held against rotation by the braking means 26, as will be hereinafter described.

The ratchet means 25 is provided to hold the sheave 21 against rotation relative to the drum 23 to normally prevent lowering of the window 15. The means 25 operates to connect the sheave 21 with the drum 23 for rotation in one direction and acts to permit rotation of the sheave relative to the drum in the opposite direction, so that the window may be raised in the manner described above. In the simple form of the invention illustrated in the drawing, the ratchet means 25 includes a pawl 51 carried by the drum 23 for engaging the teeth 52 of the internal gear 49. The pawl 51 is pivotally carried on a pin 53 projecting inwardly from the inner side of the drum 23. The outer end of the pawl 51 is tapered or pointed to effectively engage the teeth 52 to hold the sheave 21 against rotation relative to the drum 23. Spring means is provided for normally yieldingly holding the pawl 51 in effective engagement with the teeth 52. A leaf spring 54 is carried by a pin 55 projecting from the inner side of the drum 23 and engages the inner side of the pawl 51. The spring 54 normally urges the pawl 51 into engagement with the teeth 52 to prevent rotation of the sheave 21 relative to the drum in a direction in which the cable 22 is unwound from the sheave. The pawl 51 acts to connect the sheave with the drum so that the window 15 is normally held against downward movement until the braking means 26 is released.

The braking means 26 acts on or engages the drum 23 to normally hold it against rotation. The means 26 is releasable to permit rotation of the drum 23, and sheave 21 connected with the drum by the pawl 51, to allow the window 15 to lower or drop. In the preferred form of the invention, the means 26 includes a metal band 60 surrounding the axial flange 40 of the drum 23. The band 60 is formed of flexible resilient material and is transversely split at one side. Outwardly projecting flanges 61 are provided at the edges of the split in the band 60. The band 60 may be distorted or bent at a point opposite the split to have an outwardly projecting lug 62. Brake lining or friction lining 63 is mounted on the inner side of the band 60 to engage the outer side of the flange 40. An outwardly projecting radial flange 64 may be provided at the outer edge of the flange 40 to retain the band 60 in position. The band 60 may be held against rotation by a stop 65 engaging one of the flanges 61 and a suitable fixed stop bracket engaging the lug 62.

Means is provided for releasably retaining the band 60 in a position where the lining 63 grips the flange 40 to prevent rotation of the drum. The means for releasably retaining the brake band in the operating position may be in the nature of a spring means. In the particular case illustrated, the means 26 includes a helical spring 67 connected between the arms or flanges 61 and normally urging them toward one another to hold the lining 63 in effective braking engagement with the flange 40. The spring 67 is sufficiently strong to effectively hold the drum and sheave 21 against rotation so that vibration commonly encountered in motor vehicles will not cause the window 15 to lower.

The means for releasing the brake lining 63 from the drum flange 40 is manually operable and includes a spring arm 70 attached at its outer end to the mounting member 28. The inner end of the arm 70 carries a transversely disposed part having outwardly divergent arms 71. The spring arm 70 extends over or between the flanges 61, and the divergent arms 71 are adapted to engage the flanges 61 when the arm is depressed to spread them apart and release the lining 63 from the brake drum. A push handle or button 72 projects from the arm 70. The button 72 may extend through the inner side 11 of the door structure so that it is readily accessible.

It is believed that the utility and operation of the device provided by the present invention will be readily apparent from the foregoing detailed description. When it is desired to raise the window 15 from a down position, the handle 45 is operated to rotate the pinion 41 in the direction indicated by the arrow in Fig. 4 of the drawing. Rotation of the pinion 41 in this direction causes the intermediate pinion 47 and the sheave 21 to be rotated in the directions indicated by the arrows, so that the line or cable 22 is wound on the sheave and the window is raised. During raising of the window 15 in this manner, the brake lining 63 is held in braking engagement with the flange 40 by the spring 67 so that the drum 23 is held against rotation. During raising of the window, the teeth 52 ratchet past the pawl 51; and, when rotation of the sheave 21 is stopped, the pawl engages a tooth 52 to prevent rotation of the sheave in the opposite direction. Accordingly, the weight of the window 15 is supported on the drum 23 through the line 22, the sheave 21, and the pawl 25. The spring 67 is of sufficient strength to retain the friction lining 63 in effective braking engagement with the flange 40 so that the weight of the window 15 cannot cause rotation of the drum. When it is desired to lower the window 15, the spring arm 70 is depressed by pushing inwardly on the button 72. Inward movement of the spring arm 70 wedges the arms 71 between the flanges 61 to spread them apart so that the brake lining 63 is disengaged from the flange 40. Disengagement of the brake lining 63 from the drum frees the drum and sheave 21 for rotation, and the weight of the window causes the sheave and drum to be rotated so that the line 22 is unwound from the sheave 21. Downward movement of the window 15 may be effectively controlled by means of the push button 72. Partial depression of the arm 71 will cause the brake lining 63 to be partially disengaged from the flange 40 so that the window 15 is permitted to drop slowly. Downward movement of the window 15 may be stopped by releasing the button 72 and allowing the spring arm to return to its normal position where the arms 71 are free of the flanges 61.

It is to be noted that the present invention provides a window operating mechanism that is particularly simple and inexpensive of manufacture and which may be readily installed in the body or door structure of a vehicle. The window may be quickly lowered by operating the push button 72 without rotating or in any way handling the crank 45. Downward movement of the window may be readily controlled so that there is little or no danger of breaking the window 15 by allowing it to fall.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A device for operating a slidable closure, including a sheave for reeling a line attached to the closure, manually operable means for rotating the sheave in one direction to wind the line onto the sheave to operate the closure, a rotable element, releasable brake means normally holding the element against rotation including a friction brake band surrounding the element, and means connecting the sheave with the element to normally hold the sheave against rotation in the other direction and to cause it to rotate therewith in the said other direction when the brake means is released.

2. A device for operating a slidable closure, including a sheave for reeling a line attached to the closure, means remote from the closure for rotating the sheave in one direction to wind the line onto the sheave to operate the closure, an element rotatable independently of the sheave, manually releasable brake means normally holding the element against rotation, a single shaft carrying the sheave and the element, and means connecting the sheave with the element to normally hold the sheave against rotation in the other direction when the brake means is set and to cause it to rotate together therewith in the said other direction when the brake means is released.

3. A device for operating a slidable closure, including a sheave for reeling a line attached to the closure, means for rotating the sheave in one direction to reel the line onto the sheave, a rotatable drum, a releasable brake band surrounding the drum and normally holding the drum against rotation, and ratchet means for connecting the sheave with the drum to normally hold the sheave against rotation in the other direction.

4. A device for operating a slidable closure, including a sheave, a line carried by the sheave and carrying the closure, a rotatable drum, means for rotating the sheave in a direction to wind the line onto the sheave, including a handle, a gear connected to the handle, a gear on the sheave, and a pinion carried by the drum and meshing with the said gears, manually releasable brake means normally holding the drum against rotation, and means for connecting the sheave with the drum to hold it against rotation relative to the drum in the other direction.

5. A device for operating a slidable closure, including a sheave, a line carried by the sheave and carrying the closure, a rotatable drum, means for rotating the sheave in a direction to wind the line onto the sheave, including a handle, a gear connected to the handle, an internal gear on the sheave, and a pinion meshing with the said gears, releasable brake means normally holding the drum against rotation, and means for connecting the sheave with the drum to hold it against rotation relative to the drum in the other direction.

6. A device for operating a slidable closure, including a sheave, a line carried by the sheave and carrying the closure, a rotatable drum, means for rotating the sheave in a direction to wind the line onto the sheave, including a handle, a gear connected to the handle, an internal gear on the sheave, and a pinion meshing with the said gears, releasable brake means normally holding the drum gainst rotation, and means for connecting the sheave with the drum to hold it against rotation relative to the drum in the other direction, including a pawl carried by the drum and engaging the teeth of the internal gear.

7. A device for operating a slidable closure, including a sheave, a line wound on the sheave and carrying the closure, manually operable gear means for rotating the sheave in one direction to wind the line onto the sheave to operate the closure, a rotatable drum, a single shaft supporting both the sheave and drum, brake means normally engaging the drum to hold it against rotation, manual means for releasing the brake means, and means for connecting the sheave with the drum to rotate therewith to allow the line to unwind from the sheave when the brake means is released.

8. A device for operating a slidable closure, including a sheave, a line wound on the sheave and carrying the closure, manually operable means remote from the closure for rotating the sheave in one direction to wind the line onto the sheave to operate the closure in one direction, a rotatable drum, brake means normally engaging the drum to hold it against rotation, including a band surrounding the drum and lining on the band to engage the drum, manual means for releasing the brake means, and means for connecting the sheave with the drum to rotate therewith to allow the line to unwind from the sheave when the brake means is released to permit operation of the closure in the other direction.

9. A device for operating a slidable closure, including a sheave, a line wound on the sheave and carrying the closure, manually operable means remote from the closure for rotating the sheave in one direction to wind the line onto the sheave to raise the closure, a rotatable drum, brake means normally engaging the drum to hold it against rotation, including a band surrounding the drum, lining on the band, and means holding the lining in braking engagement with the drum, manual means for releasing the brake means, and means for connecting the sheave with the drum to rotate therewith to allow the line to unwind from the sheave when the brake means is released to permit lowering of the closure by gravity.

10. A device for operating a slidable closure, including a sheave, a line wound on the sheave and carrying the closure, manually operable means independent of the closure for rotating the sheave in one direction to wind the line onto the sheave for raising the closure, a rotatable drum, brake means normally engaging the drum to hold it against rotation, including a brake band surrounding the drum, lining on the brake band, spring means for holding the band in a position where the lining is in engagement with the drum, means for releasing the brake means, including spaced flanges on the band, an arm, and a wedge on the arm operable to spread the flanges apart, and means for connecting the sheave with the drum to hold it against rotation in the other direction until the brake means is released to allow lowering of the closure.

11. A device for operating a slidable closure, including a sheave, a line wound on the sheave and carrying the closure, means for rotating the sheave in one direction to wind the line onto the sheave, a rotatable drum, brake means normally engaging the drum to hold it against rotation, including a brake band surrounding the drum, lining on the brake band, spring means for holding the band in a position where the lining is in engagement with the drum, means for releasing the brake means including spaced flanges on the band, an arm, an operating handle on the arm, and a wedge on the arm operable to spread the flanges apart, and means for connecting the sheave with the drum to hold it against rotation in the other direction until the brake means is released.

In witness that I claim the foregoing I have hereunto subscribed my name this 11th day of October 1930.

THOMAS B. MATTINGLY.